United States Patent Office 3,100,221
Patented Aug. 6, 1963

3,100,221
AMINE SALTS OF BORON ACIDS
Edward L. Kay, Akron, Ohio, and Edwin C. Knowles, Poughkeepsie, N.Y., assignors to Texaco Inc., New York, N.Y., a corporation of Delaware
No Drawing. Filed Jan. 17, 1961, Ser. No. 83,176
5 Claims. (Cl. 260—462)

This invention relates to novel amine salts of boron containing "acids." More particularly, this invention relates to primary, secondary and tertiary amine salts of tetra-covalent boron "acids."

The usefulness of many organo-boron compounds, for example, such borate esters as lubricating oil additives, has been seriously hindered by their hydrolytic instability. The advantage of the boron compounds of the present invention are that they are hydrolytically stable, oxidation stable and thermally stable in both storage and use. The novel amine salts of the present invention formed by reaction of an aliphatic hydrocarbyl amine and a tetra-covalent boron "acid" are useful as load carrying additives for mineral and synthetic base lubricating oils. Our commonly-assigned, co-pending application, Serial No. 83,180, filed of even date, relates to lubricating compositions containing selected high molecular weight amine salts of this invention.

The amine salts of tetra-covalent boron "acids" of the present invention are represented by the following general formula:

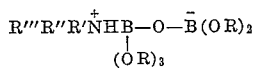

wherein R is a hydrocarbyl radical containing 1 to 24 carbon atoms, R' is an aliphatic hydrocarbyl or hydroxy substituted aliphatic hydrocarbyl radical containing one or more carbon atoms and preferably at least 8 to about 30 carbon atoms and R'' and R''' are hydrogen, aliphatic hydrocarbyl or hydroxy substituted aliphatic hydrocarbyl radicals containing 1 to 24 carbon atoms.

The term hydrocarbyl radical when used herein denotes mono-valent hydrocarbon radical.

One of the significant differences between alkyl borates and the alkyl diborates is that the alkyl borates have a planar structure in contrast to the "V-shape" diborate molecule as disclosed herein. The fundamental structural difference may be illustrated by the following structure:

One interesting aspect is that the molecule has a relatively stearically unhindered polar oxygen intersection of the V. The stearically unhindered oxygen results in great adsorption of the diboric molecule on metal surfaces. As a result the potential uses as lubricating oil additives of diborate containing molecules is greatly enhanced.

In accordance with the present invention, novel amine salts of tetraalkoxide or aryloxide boron acid composition may be produced by the following general process:

The compositions of the present invention are prepared by reacting an alkoxide or aryloxide tetra covalent organic diboro "acid" with primary, secondary, or tertiary aliphatic amine containing at least one or more carbon atoms and preferably at least 8 to 30 carbon atoms. The reaction mixture may be diluted with solvent, heated to reflux, filtered, solvent stripped from the filtrate at atmospheric pressure and the amine salt of the present invention thus obtained.

The aliphatic amines employed in the formation of the novel amine salts of tetra alkoxide or aryloxide diboron acid are represented by the formula:

$$R'''R''R'N$$

wherein R' is an aliphatic hydrocarbyl or halogen substituted aliphatic hydrocarbyl radical containing at least one or more carbon atoms and preferably at least 8 to 30 carbon atoms and R'' and R''' are hydrogen, aliphatic hydrocarbyl or hydroxy substituted aliphatic hydrocarbyl radicals containing 1 to 24 carbon atoms. Examples of effective primary, secondary and tertiary amines are ethylamine, isopropylamine, n-propylamine, 2-ethylhexylamine, n-amylamine, triamylamine, t-octylamine, laurylamine and mixtures of primary aliphatic amines such as commercially available mixtures of t-alkyl amines containing 11 to 14 carbon atoms and a mixture of t-alkyl primary amines wherein the alkyl group contains 18 to 22 carbon atoms.

The organic diboro "acids" employed in the formation of the present invention are transitory compounds and as such do not exist in the isolated state. They do, however, form stable salts. The "acids" are formed by reacting an alcohol with organic diborates which are prepared by reacting a phenol or an alcohol with boric acids in a two to one molar ratio in the presence of refluxing xylene. The water of the reaction is removed as an azeotrope and is taken as a measure of reaction completion. Generalized equation for the above described reaction may be written as follows:

$$4ROH + 2B(OH)_3 \longrightarrow (RO)_2B-O-B(OR)_2 + 5H_2O$$

$$(RO)_2B-O-B(OR)_2 + ROH \longrightarrow \overset{+}{H}[(RO)_2B-O-B(OR)_3]^-$$

wherein R is either hydrogen or a hydrocarbyl radical containing 1 to 24 carbon atoms. The tetra alkoxide or aryloxide diboro "acids" employed in the formation of the amine salts of the present invention can be represented by the formula:

$$\overset{+}{H}[(RO)_2-B-O-B-(OR)_3]^-$$

wherein R is a hydrogen or a hydrocarbyl radical containing 1 to 24 carbon atoms. Examples of effective "acids" are penta methoxy diboro acid,
penta-n-propoxy diboro acid,
penta secondary butoxy diboro acid,
penta benzyloxy diboro acid,
penta (nonylphenoxy) diboro acid,
tri-n-propoxy-di-isopropoxy diboro acid,
tri-n-propoxy-di-n-butoxy diboro acid,
tri-n-propoxy-di-isobutoxy diboro acid,
tri-n-propoxy-di-secondary-butoxy diboro acid,
tri-n-propoxy-di-tertiary-butoxy diboro acid,
tri-n-propoxy-di-pentoxy diboro acid,
tri-n-propxy-di-n-hexoxy diboro acid,
tri-n-propxy-di-2-ethylhexoxy diboro acid,
tri-n-propoxy-di-oleyloxy diboro acid,
tri-n-propoxy-di-benzyloxy diboro acid,
tri-n-propoxy-di-tetrahydrofurfuryloxy diboro acid,
tri-n-propoxy-di-betachloroethoxy diboro acid,
tri-n-propoxy-di-nonylphenoxy diboro acid
and tri-(nonyl-phenoxy)-n-di-propxy diboro acid.

Upon the formation of the transitory "acids," described above, the amine is reacted therewith to obtain the amine salts of the present invention, the reaction for which can be represented by the following general equation:

$$R'''R''R'+\overset{+}{H}[-R_2-B-O-B-R_3]^- \longrightarrow$$

$$R'''R''R'\overset{+}{N}H[R_2-B-O-B-R_3]^-$$

wherein R is a hydrocarbyl radical containing 1 to 24 carbon atoms, R' is an aliphatic hydrocarbyl radical or hydroxy substituted aliphatic hydrocarbyl radical containing one or more carbon atoms and preferably at least 8 to about 30 carbon atoms and R'' and R''' are hydrogen aliphatic hydrocarbyl or hydroxy substituted aliphatic hydrocarbyl radicals containing 1 to 24 carbon atoms.

The preparation of the specific novel acid amine salts of tetra-covalent boron acids of the present invention is illustrated in the following examples:

EXAMPLE I

*Preperation of Amine Salt of Penta (Nonylphenoxy) Di Boro "Acid"*

110 grams, 0.5 mol of nonylphenol was added to 459 grams, 0.5 mol of tetra (nonylphenoxy) diborate, the pot temperature rose from 27° C. to 35° C., thereafter 100 grams, 0.5 mol of t-$C_{11}$–$C_{14}$ mixture of alkyl primary amine was added to the reaction pot. The pot temperature rose from 25° C. to 70° C. Solvent and volatiles were removed by distillation and the t-$C_{11}$–$C_{14}$ alkyl primary amine-penta (nonylphenoxy) diborate having the formula:

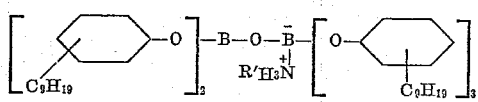

wherein R' is a tertiary alkyl group containing 11 to 14 carbon atoms, was isolated.

EXAMPLE II

*Preparation of Amine Salt of Penta Benzyloxy Di Boro "Acid"*

54 grams, 0.5 mol of benzyl alcohol were added to 344 grams, 0.5 mol of tetra benzyl diborate, the pot temperature rose from 28° C. to 33° C. 100 grams, 1.0 mol of t-$C_{11}$–$C_{14}$ mixture of alkyl primary amine were added to the reaction pot and the temperature rose from 33° C. to 51° C. Solvent and volatiles were removed by distillation and the t-$C_{11}$–$C_{14}$ alkyl primary amine-penta benzyloxy diborate having the formula:

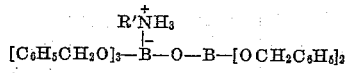

wherein R' is a tertiary alkyl group containing 11 to 14 carbon atoms, was isolated.

As is known in the art, many organo-borate compounds do not always perform as satisfactory additives for lubricants, fuels and the like because of their hydrolytic instability and it is to this end that the salts of the present invention demonstrate at least one of their advantages. The amine salts of alkoxide or aryloxide tetra-covalent diboron "acids" of the present invention are hydrolytically stable in both water and lubricating oils.

In addition to the above specific examples the following are illustrative of amine salts of tetra covalent diboron acids of the present invention: t-$C_{11}$–$C_{14}$ alkyl primary amine penta methoxy diborate, t-$C_{18}$–$C_{22}$ alkyl primary amine penta methoxy diborate, ethylamine penta methoxy diborate, isopropylamine penta methoxy diborate, n-propylamine penta methoxy diborate, 2-ethylhexylamine penta methoxy diborate, n-amylamine penta methoxy diborate, t-octylamine penta methoxy diborate, triamylamine penta methoxy diborate, laurylamine penta methoxy diborate, t-$C_{11}$–$C_{14}$ alkyl primary amine penta n-propoxy diborate, t-$C_{18}$–$C_{22}$ alkyl primary amine penta-n-propoxy diborate, ethylamine penta-n-propoxy diborate, isopropyl-amine penta-n-propoxy diborate, n-propylamine penta-n-propoxy diborate, 2-ethylhexylamine penta-n-propoxy diborate, n-amylamine penta-n-propoxy diborate, t-octylamine penta-n-propoxy diborate, triamylamine penta-n-propoxy diborate, laurylamine penta-n-propoxy diborate, t-$C_{11}$–$C_{14}$ alkyl primary amine penta secondary butoxy diborate, t-$C_{18}$–$C_{22}$ alkyl primary amine penta secondary butoxy diborate, ethylamine penta secondary butoxy diborate, isopropylamine penta secondary butoxy diborate, n-propylamine penta secondary butoxy diborate, 2-ethylhexylamine penta secondary butoxy diborate, n-amylamine penta secondary butoxy diborate, t-octylamine penta secondary butoxy diborate, triamylamine penta secondary butoxy diborate, laurylamine penta secondary butoxy diborate, t-$C_{11}$–$C_{14}$ alkyl primary amine tri-n-propoxy-di-isopropoxy diborate, t-$C_{18}$–$C_{22}$ alkyl primary amine tri-n-propoxy-di-isopropoxy diborate, ethylamine tri-n-propoxy-di-isopropoxy diborate, isopropylamine tri-n-propoxy-di-isopropoxy diborate, n-propylamine tri-n-propoxy-di-isopropoxy diborate, 2-ethylhexylamine tri-n-propoxy-di-isopropoxy diborate, n- amylamine tri-n-propoxy-di-isopropoxy diborate, t-octylamine tri-n-propoxy-di-isopropoxy diborate, triamylamine tri-n-propoxy-di-isopropoxy diborate, laurylamine tri-n-propoxy-di-isopropoxy diborate, t-$C_{11}$–$C_{14}$ alkyl primary amine tri-n-propoxy-di-n-butoxy diborate, t-$C_{18}$–$C_{22}$ alkyl primary amine tri-n-propoxy-di-n-butoxy diborate, ethylamine tri-n-propoxy-di-n-butoxy diborate, isopropylamine tri-n-propoxy-di-n-butoxy diborate, n-propylamine tri-n-propoxy-di-n-butoxy diborate, 2-ethylhexylamine tri-n-propoxy-di-n-butoxy diborate, n-amylamine tri-n-propoxy-di-n-butoxy diborate, t-octylamine tri-n-propoxy-di-n-butoxy diborate, triamylamine tri-n-propoxy-di-n-butoxy diborate, laurylamine tri-n-propoxy-di-n-butoxy diborate, t-$C_{11}$–$C_{14}$ alkyl primary amine tri-n-propoxy-di-isobutoxy diborate, t-$C_{18}$–$C_{22}$ alkyl primary amine tri-n-propoxy di-isobutoxy diborate, ethylamine tri-n-propoxy-di-isobutoxy diborate, isopropylamine tri-n-propoxy-di-isobutoxy diborate, n-propylamine tri-n-propoxy-di-isobutoxy diborate, 2-ethylhexylamine tri-n-propoxy-di-isobutoxy diborate, n-amylamine tri-n-propoxy-di-isobutoxy diborate, t-octylamine tri-n-propoxy-di-isobutoxy diborate, triamylamine tri-n-propoxy-di-isobutoxy diborate, laurylamine tri-n-propoxy-di-isobutoxy diborate, t-$C_{11}$–$C_{14}$ alkyl primary amine tri-n-propoxy-di-secondary-butoxy diborate, t-$C_{18}$–$C_{22}$ alkyl primary amine tri-n-propoxy-di-secondary-butoxy diborate, ethylamine tri-n-propoxy-di-secondary-butoxy diborate, isopropylamine tri-n-propoxy-di- secondary-butoxy diborate, n-propylamine tri-n-propoxy-di-secondary-butoxy diborate, 2-ethylhexylamine tri-n-propoxy-di-second-ary-butoxy diborate, n-amylamine tri-n-propoxy di-sec-ond-butoxy diborate, t-octylamine tri-n-propoxy-di- secondary-butoxy diborate, triamylamine tri-n-propoxy-di-secondary-butoxy diborate laurylamine tri-n-propoxy-di-secondary-butoxy diborate, t-$C_{11}$–$C_{14}$ alkyl primary amine tri-n-propoxy-di-tertiary-butoxy diborate, t-$C_{18}$–$C_{22}$ alkyl primary amine tri-n-propoxy-di-tertiary-butoxy diborate, ethylamine tri-n-propoxy-di-tertiary-butoxy diborate, isopropylamine tri-n-propoxy-di-tertiary-butoxy diborate, n-propylamine tri-n-propoxy-di-tertiary-butoxy diborate, 2-ethylhexylamine tri-n-propoxy-di-tertiary-butoxy diborate, n-amylamine tri-n-propoxy-di-tertiary-butoxy diborate, t-octylamine tri-n-propoxy-di-tertiary-butoxy diborate, tri-amylamine tri-n-propoxy-di-tertiary-butoxy diborate, laurylamine tri-n-propoxy-di-tertiary-butoxy diborate, t-$C_{11}$–$C_{14}$ alkyl primary amine tri-n-propoxy-di-pentoxy diborate, t-$C_{18}$–$C_{22}$ alkyl primary amine tri-n-propoxy-di-pentoxy diborate, ethylamine tri-n-propoxy-di-pentoxy diborate, isopropylamine tri-n-propoxy-di-pentoxy diborate, n-propylamine tri-n-propoxy-di-pentoxy diborate, 2-ethylhexylamine tri-n-propoxy-di-pentoxy diborate, n-amylamine tri-n-propoxy-di-pentoxy diborate, t-octylamine tri-n-propoxy-di-pentoxy diborate, triamylamine tri-n-propoxy-di-pentoxy diborate, laurylamine tri-n-propoxy di-pentoxy diborate, t-$C_{11}$–$C_{14}$ alkyl primary amine tri-n-propoxy-di-n-hexoxy diborate, t-$C_{18}$–$C_{22}$ alkyl primary amine tri-n-propoxy-di-n-hexoxy diborate, ethylamine tri-n-propoxy-di-n-hexoxy diborate, isopropylamine tri-n-propoxy di-n-hexoxy diborate, n-propylamine tri-n-propoxy-di-n-hexoxy diborate, 2-ethylhexylamine tri-n-propoxy-di-n-hexoxy diborate, n-amylamine tri-n-propoxy-di-n-hexoxy diborate, t-octylamine tri-n-propoxy-di-n-hexoxy diborate, triamylamine tri-n-propoxy-di-n-hexoxy diborate, laurylamine tri-n-propoxy-di-n-hexoxy diborate, t-$C_{11}$–$C_{14}$ alkyl primary amine tri-n-propoxy-di-2-ethylhexoxy diborate, t-$C_{18}$–$C_{22}$ alkyl primary amine tri-n-propoxy-di-2-ethylhexoxy diborate, ethylamine tri-n-propoxy-di-2-ethylhexoxy diborate, isopropylamine tri-n-propoxy-di-2-ethylhexoxy diborate, n-propylamine tri-n-propoxy-di-2-ethylhexoxy diborate, 2-ethylhexylamine tri-n-propoxy-di-2-ethylhexoxy diborate, n-amylamine tri-n-propoxy-di-2-ethylhexoxy diborate, t-octylamine tri-n-propoxy-di-2-ethylhexoxy diborate, triamylamine tri-n-propoxy-di-2-ethylhexoxy diborate, laurylamine tri-n-propoxy-di-2-ethylhexoxy diborate, t-$C_{11}$–$C_{14}$ alkyl primary amine tri-n-propoxy-di-oleyloxy diborate, t-$C_{18}$–$C_{22}$ alkyl primary amine tri-n-propoxy-di-oleyloxy diborate, ethylamine tri-n-propoxy-di-oleyloxy diborate, isopropylamine tri-n-propoxy-di-oleyloxy diborate, n-propylamine tri-n-propoxy-di-oleyloxy diborate, 2-ethylhexylamine tri-n-propoxy-di-oleyloxy diborate, n-amylamine tri-n-propoxy-di-oleyloxy diborate, t-octylamine tri-n-propoxy-di-oleyloxy diborate, triamylamine tri-n-propoxy-di-oleyloxy diborate, laurylamine tri-n-propoxy-di-oleyloxy diborate, t-$C_{11}$–$C_{14}$ alkyl primary amine tri-n-propoxy-di-benzyloxy diborate, t-$C_{18}$–$C_{22}$ alkyl primary amine tri-n-propoxy-di-benzyloxy diborate, ethylamine tri-n-propoxy-di-benzyloxy diborate, isopropylamine tri-n-propoxy di-benzyloxy diborate, n-propylamine tri-n-propoxy di-benzyloxy diborate, 2-ethylhexylamine tri-n-propoxy-di-benzyloxy diborate, n-amylamine tri-n-propoxy-di-benzyloxy diborate, t-octylamine tri-n-propoxy-di-benzyloxy diborate, triamylamine tri-n- propoxy-di-benzyloxy diborate, laurylamine tri-n-propoxy-di-benzyloxy diborate, t-$C_{11}$–$C_{14}$ alkyl primary amine tri-n-propoxy-di-tetrahydrofurfuryloxy diborate, t-$C_{18}$–$C_{22}$ alkyl primary amine tri-n-propoxy-di-tetrahydrofurfuryloxy diborate, ethylamine tri-n-propoxy-di-tetrahydrofurfuryloxy diborate, isopropylamine tri-n-propoxy-di-tetrahydrofurfuryloxy diborate, n-propylamine tri-n-propoxy-di-tetrahydrofurfuryloxy diborate, 2-ethylhexylamine tri-n-propoxy-di-tetrahydrofurfuryloxy diborate, n-amylamine tri-n-propoxy-di-tetrahydrofurfuryloxy diborate, t-octylamine tri-n-propoxy-di-tetrahydrofurfuryloxy diborate, triamylamine tri-n-propoxy-di-tetrahydrofurfuryloxy diborate, laurylamine tri-n-propoxy-di-tetrahydrofurfuryloxy diborate, t-$C_{11}$–$C_{14}$ alkyl primary amine tri-n-propoxy-di-betachloroethoxy diborate, t-$C_{18}$–$C_{22}$ alkyl primary amine tri-n-propoxy di-betachloroethoxy diborate, ethylamine tri-n-propoxy-di-betachloroethoxy diborate, isopropylamine tri-n-propoxy-di-betachloroethoxy diborate, n-propylamine tri-n-propoxy-di-betachloroethoxy diborate, 2-ethylhexlamine tri-n-propoxy-di-betachloroethoxy diborate, n-amylamine tri-n-propoxy-di-betachloroethoxy diborate, t-octylamine tri-n- propoxy-di-betachloroethoxy diborate, triamylamine tri-n-propoxy-di-betachloroethoxy diborate, laurylamine tri-n-propoxy-di-betachloroethoxy diborate, t-$C_{11}$–$C_{14}$ alkyl primary amine tri-n-propoxy-di-nonylphenoxy diborate, t-$C_{18}$–$C_{22}$ alkyl primary amine tri-n-propoxy-di-nonylphenoxy diborate, ethylamine tri-n-propoxy-di-nonylphenoxy diborate, isopropylamine tri-n-propoxy-di-nonylphenoxy diborate, n-propylamine tri-n-propoxy-di-nonylphenoxy diborate, 2-ethylhexylamine tri-n-propoxy-di-nonylphenoxy diborate, n-amylamine tri-n-propoxy di-nonylphenoxy diborate, t-octylamine tri-n-propoxy-di-nonylphenoxy diborate, triamylamine tri-n-propoxy-di-nonylphenoxy diborate, laurylamine tri-n-propoxy-di-nonylphenoxy diborate, t-$C_{11}$–$C_{14}$ alkyl primary amine tri-(nonylphenoxy)-di-n-propoxy diborate, t-$C_{18}$–$C_{22}$ alkyl primary amine tri-(nonylphenoxy)-di-n-propoxy diborate, ethylamine tri-(nonylphenoxy)-di-n-propoxy diborate, isopropylamine tri-(nonylphenoxy)-di-n-propoxy diborate, n-propylamine tri-(nonylphenoxy)-di-n-propoxy diborate, 2-ethylhexylamine tri-(nonylphenoxy)-di-n-propoxy diborate, n-amylamine tri-(nonylphenoxy)-di-n-propoxy diborate, t-octylamine tri-(nonylphenoxy)-di-n-propoxy diborate, triamylamine tri-(nonylphenoxyl)-di-n-propoxy diborate, laurylamine tri-(nonylphenoxy)-di-n-propoxy diborate.

As is clear from the foregoing disclosure and examples, considerable latitude may be exercised in the choice of primary, secondary or tertiary amines and in the selection of the alkoxide and aryloxide tetra-covalent diboron acid.

We claim:

1. Amine salts of tetra-covalent boron acids having the formula:

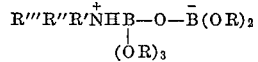

wherein R is a hydrocarbyl radical containing 1 to 24 carbon atoms, R' is selected from the group consisting of aliphatic hydrocarbyl and hydroxy substituted aliphatic hydrocarbyl radicals containing 1 to 30 carbon atoms and R" and R''' are selected from the group consisting of hydrogen, aliphatic hydrocarbyl and halogen substituted aliphatic hydrocarbyl radicals.

2. Amine salts described in claim 1 wherein R' is an aliphatic hydrocarbyl radical containing 11 to 14 carbon atoms.

3. Amine salts described in claim 1 where R' is an aliphatic hydrocarbyl radical containing 18 to 22 carbon atoms.

4. An amine salt having the formula:

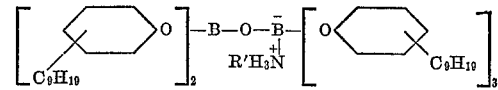

wherein R' is a tertiary alkyl group mixture containing 11 to 14 carbon atoms.

5. An amine salt having the formula:

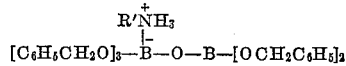

wherein R' is a tertiary alkyl group mixture containing 11 to 14 carbon atoms.

No references cited.